United States Patent [19]

Ruhle

[11] Patent Number: 4,616,855
[45] Date of Patent: Oct. 14, 1986

[54] THREADLESS NONROTATING STEEL COUPLING SYSTEM

[76] Inventor: James L. Ruhle, 2535 E. Balfour Ave., Fullerton, Calif. 92634

[21] Appl. No.: 665,996

[22] Filed: Oct. 29, 1984

[51] Int. Cl.$^4$ .............................................. F16L 35/00
[52] U.S. Cl. ..................................... 285/24; 285/39; 285/319; 285/330; 285/921; 285/374; 285/910
[58] Field of Search ............... 285/DIG. 11, 374, 319, 285/328, DIG. 22, 24, 27, 330, 39, 921, 910; 403/289, 290, 309, 302

[56] References Cited

U.S. PATENT DOCUMENTS

| | | | |
|---|---|---|---|
| 1,157,574 | 10/1915 | Mueller | 285/DIG. 11 |
| 2,452,219 | 10/1948 | Bergvall et al. | 285/DIG. 22 |
| 2,805,872 | 9/1957 | Routh | 285/DIG. 11 |
| 3,442,536 | 5/1969 | Fowler | 285/27 |
| 3,455,579 | 7/1969 | Olliff et al. | 285/319 X |
| 3,569,903 | 3/1971 | Brishka | 285/319 |
| 3,733,577 | 5/1973 | Hammond | 285/DIG. 22 |
| 3,950,014 | 4/1976 | Doubleday | 285/27 X |
| 4,298,221 | 11/1981 | McGugan | 285/328 |

Primary Examiner—Dave W. Arola

[57] ABSTRACT

A threadless nonrotating steel coupling system that is quickly connected and disconnected in an axial manner by simple hand tools, is sealed by a compressible gasket, and is locked together by a pin system to prevent rotation of the male half-coupling relative to the female half-coupling. The coupling is held together by means of matching circular saw-toothed ridges and grooves at right angles to the axis of the coupling, which substitute for the pitched threads used in standard threaded coupling systems. The steel male half-coupling is rigid whereas the steel female half-coupling, which contains a series of spring-loaded and parallel longitudinal fingers, is flexible, since each steel finger is free to move in a radial direction with respect to the axis of the coupling system.

1 Claim, 1 Drawing Figure

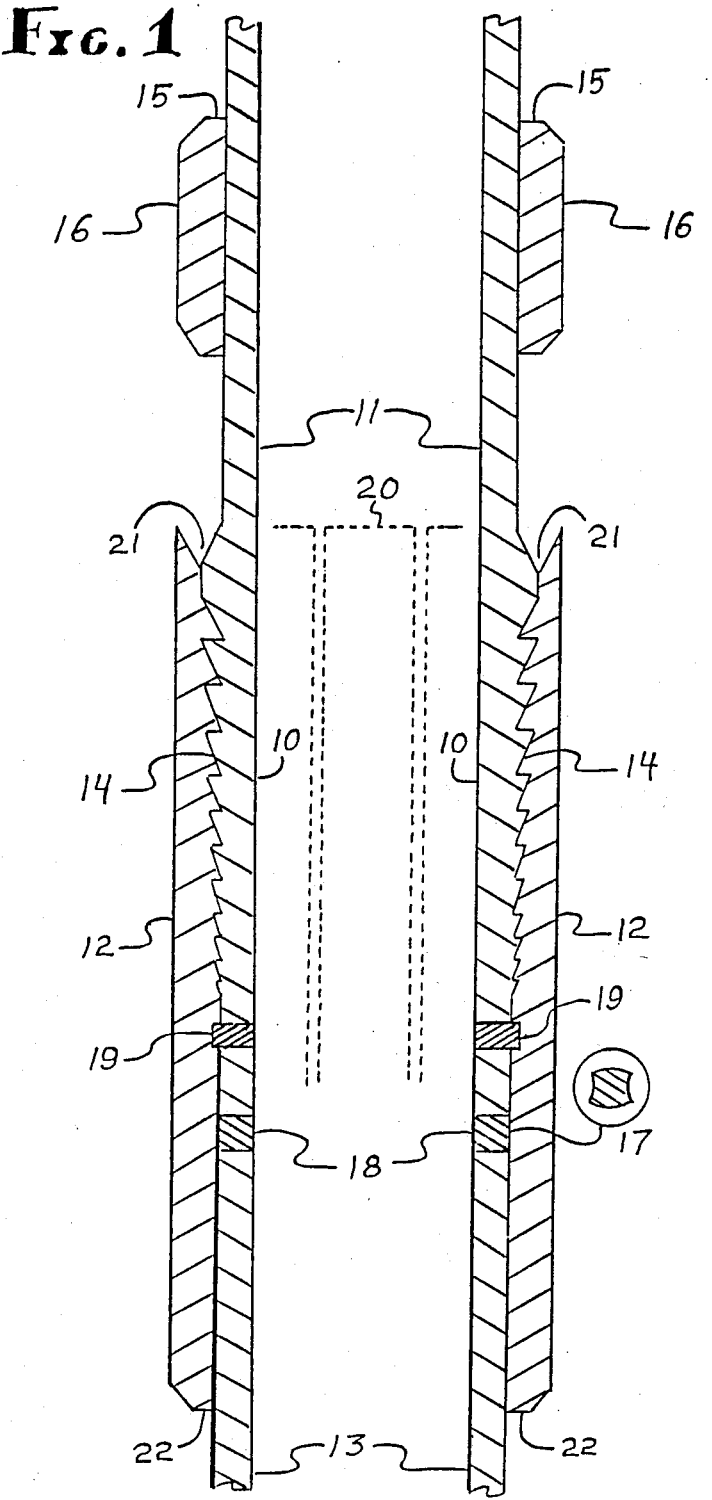

THREADLESS NONROTATING STEEL COUPLING SYSTEM

BACKGROUND

Threaded steel couplings have been used for many years to join, or connect a wide assortment of casing, pipe, tubing, hose, as well as solid rod. Such threaded connection, particularly, when used in subsurface applications such as those involving oil, gas, or geothermal wells, require high torque make-up and break-out tools, which are generally combersome and awkward to operate, often resulting in serious injuries and occasional fatal injuries to the operating personnel.

Furthermore, the excessive amount of time required to make such threaded connections or disconnetions is an important factor since this procedure must be repeated over and over again. perhaps, several hundred times for subsurface applications involving deep wells. For example when connecting drill pipe together on a large hydraulic rotary drilling rig the following fifteen separate steps are necessary:

1. Place back-up tong around female end of drill-pipe stub.
2. Place make-up tong around female end of drill-pipe stub.
3. Wrap spinning chain around female half-coupling.
4. Insert, or stab, the male end of drill pipe into female end of drill pipe.
5. Throw spinning chain loops around male end of drill pipe.
6. Spin-up the new section of drill pipe to the drill-pipe stub.
7. Raise the make-up tongs to the male half-coupling.
8. Raise the back-up tongs to the female half-coupling.
9. Push the back-up tong forward to the bite position.
10. Push the make-up tong forward to the bite position.
11. Complete the threaded connection with the make-up tong.
12. Push the back-up tong forward.
13. Unlatch and remove the back-up tong.
14. Push the make-up tong forward.
15. Unlatch and remove the make-up tong.

The foregoing fifteen steps require a crew of three men working together around the rotary table—one to operate the back-up tong and the spinning chain, one to operate the make-up tong, and one to assist with the tongs and stab the drill pipe. The time required to accomplish all fifteen steps, some of which are performed simultaneously, is approximately 30 seconds.

By contrast, the applicant's invention does not require any high-torque make-up or break-out tools, but instead requires simple hand tools consisting of a common hammer, a two-pronged make-up fork, and a shoehorn break-out system. For example, when connecting pipe together for subsurface applications in volving deep wells, just four steps are required:

1. Insert, or stab. male end of the pipe into the female half-coupling.
2. Place make-up fork on appropriate position on male half-coupling.
3. Drive male half-coupling into female half-coupling, using common hammer or light maul.
4. Remove make-up fork from male half-coupling.

The foregoing four simple steps can be performed easily by just one man in approximately five seconds, which, not only drives the two half-couplings tightly and securely together, but also compresses the gasket, and seals the coupling, as well.

This type of threaded connection is not plagued by joint swelling problems in high-tensile-load and high-temperature subsurface applications involving deep oil, gas, and geothermal wells, and when completely made up, results in an internally-flush central passage through the coupling resembling that of internally-flush drill pipe. The internally-flush central passage, made possible by the compressible gasket system reduces the probability of fluid flow irregularities at the couplings, which otherwise might damage the coupling system as a result of concentrated erosion or cavitation.

In subsurface applications involving oil, gas and geothermal wells, continuous copper conductors are sometimes incorporated into the wall of pipe for the transmission of electrical signals or electrical power. Since the applicant's coupling system is unthreaded, and, therefore, nonrotating, and since the male half-coupling is guided into the female half-coupling by means of pins affixed to the male half-coupling which slide through corresponding slots in the female half-coupling, electric conductors from one pipe section to another can be aligned with greater ease compared to a threaded and rotating coupling system. When completely joined together the guiding pins also lock the two half couplings together so as to prevent the rotation of one relative to the other—thus providing perfect alignment of the electrical conductors from one pipe section to another.

SUMMARY OF INVENTION

It is among the objects of the invention to provide a new and improved steel coupling system which can be joined together and separated in a safe manner by means of simple hand tools, which makes it possible to reduce by a considerable amount the time and labor that is currently devoted to making threaded connections and disconnections.

Another object of the invention is to provide a new and improved steel coupling system which has incorporated into the coupling a compressible gasket system which seals the connection, when fully compressed, in such a manner that an internally-flush central passage is created through the coupling system.

Still another object of the invention is to provide a new and improved steel coupling system, which has incorporated into the coupling, a pin and slot arrangement that guides the male half-coupling into the female half-coupling, and prevents the rotation of one relative to the other, thus maintaining the alignment of any electrical conductors that might have been incorporated into the wall of each pipe section.

With these and other objects in view, the invention consists in the arrangement and combination of the various components whereby the objects contemplated are attained, as hereinafter set forth, in the appended claims and accompanying drawing.

In the drawing:

FIG. 1 is a schematic sectional view of the coupling system.

Drawing on a typical condition as an example in describing the componets of the invention, it can be assumed that the steel coupling system is affixed to steel pipe measuring two inches in inside diameter and 2⅞ inches in outside diameter. For subsurface applications where it is necessary to suspend the pipe in a well by means of an elevator system, or a supporting device placed beneath the female half-coupling, and where it is sometimes necessary to retrieve, or fish, separated pipe from within a deep well, the outer perimeter of the female half-coupling, in the region where it is affixed to the steel pipe, serves as the elevator shoulder and fish neck.

In using the applicant's coupling system for subsurface applications such as deep oil and gas wells or geothermal wells where high temperatures are encountered the compressible gasket material used to seal the coupling system must be sufficiently resistant to such high temperatures. Polytetrafluoroethylene, sold under the trademark "Teflon", reinforced with fiberglass, is an example of such a high-temperature resistant material. The gasket, which in cross section is convex on its top and bottom edges to provide axial compressibility, is concave on its side edges to provide a straight and flush transition through the central passage of the coupling system when the coupling is completely joined together and the gasket is fully compressed.

In using the applicant's coupling system for subsurface applications where insulated copper conductors have been incorporated into the pipe wall for the purpose of transmitting electrical signals or electrical power, circuit contacts composed of an electrically-conductive substance such as graphite would be incorporated into the coupling gaskets so as to provide an unbroken electrical circuit across the couplings. For example, such a circuit contact can be created by drilling the required number of holes, depending upon the number of copper conductors, in an axial direction through the gasket, and packing each hole with graphite. As the half-couplings are brought together and as the convex top and bottom surfaces of the gasket are compressed. the graphite would extrude toward both surfaces so as to complete the electrical circuit across the coupling and through the insulated copper conductors incorporated in the pipe.

There are a number of techniques that can be employed to force the rigid male half-coupling into the flexible female half-coupling so as to achieve a complete mating of the two components created by the perfect matching of the saw-toothed ridges and grooves of the male half-coupling with the corresponding grooves and ridges of the female half-coupling, which at the same time completely compresses the gasket. There are also a number of methods that can be employed to spread the flexible fingers of the female half-coupling outward so as to release the grip on the male half-coupling, thus allowing the latter to uncouple, or separate from the female half-coupling.

The simplest manner in which the male half-coupling may be forced into the female half-coupling is by driving, or impacting the male half-coupling with a driving device such as a hammer or light maul. This can be accomplished by means of a two-pronged fork which fits into the appropriate position on the male half-coupling, and is impacted with the driving device in the direction of the female half-coupling.

The simplest manner in which the flexible fingers of the female half-coupling may be spread outward so as to release the male half-coupling is by means of an opposing shoehorn arrangement, or a split-sleeve spreading device, which is driven by hammer impact between the rigid male half-coupling and the flexible female half-coupling, thus spreading the latter's flexible fingers outward. The handle on the spreading device, which is impacted by the hammer, connects to each split sleeve through the same slots in the female half-coupling that guide the alignment pins in the male half-coupling. Deformations on the convex sides of the split-sleeve spreading tool impinge upon the saw-toothed ridges in the temale half-coupling, and hold the spreading tool in place until the male half-coupling is completely withdrawn. Since the saw-toothed ridges on the male half-coupling become progressively smaller toward its distal end, they do not interfere with the insertion of the split-sleeve spreading tool.

FIG. 1 illustrates a typical embodiment of the invention, and depicts the coupling system, which consists of the rigid steel half-coupling, 10, portrayed in the drawing as an integral part of the steel pipe, 11, and the flexible steel female half-coupling, 12, affixed permanently to the steel pipe, 13.

Connection of the two half-couplings is achieved by driving the male half-coupling, 10, into the female half-coupling, 12, and snapping the two together until matching saw-toothed ridges and grooves, 14, on both half-couplings perfectly mate. This can be accomplished by driving the male half-coupling, 10, toward the female half-coupling, 12, by impacting with a hammer or other driving device a forked tool which is placed around the steel pipe, 11, at position, 15, against the steel drive shoulder, 16, which is permanently affixed to the steel pipe, 11.

When the two half couplings are completely joined together, a compressible gasket, shown in cross section in the uncompressed state in the inset, 17, is transformed into the straight-sided and compressed state, 18, which seals the coupling system, and provides an internally-flush central passage through the latter.

An opposing pair of steel pins, 19, permantly affixed to the male half-coupling, 10, guide the latter though corresponding slots in the female half-coupling, 12, and prevent the rotation, and maintain the alignment of each half-coupling relative to the other after the coupling is completed.

Disconnection of the two half-couplings is achieved by impact-driving of a spreading tool between the outer surface of the rigid steel male half-coupling, 10, and the inner surfaces of a plurality of flexible steel fingers on the female half-coupling, 12, one of which is designated by the enclosed discontinuous lines, 20, with the spreading tool starting at position, 21, and advancing toward the distal end of the male-half-coupling, 10, until the latter is released and uncoupled from the female half-coupling, 12.

Should the coupling system be employed in a subsurface application where pipe must be suspended or elevated within a well, or where separated pipe must be retrieved from a well, the lower perimeter of the steel female half-coupling, 12, would serve as the elevator shoulder and fish neck, 22.

Whereas plade carbon steel would be used in fabricating the female half-coupling, and should generally provide satisfactory service, in certain down-hole applications special-alloyed steel may be required to impart the necessary resilience to the flexible fingers of the female half-coupling, or the length of the flexible steel fingers may be either lengthened to provide more spring action, or shortened to provide more rigidity.

In subsurface applications where abrasion might occur down-hole either against well casing or rock formations the outer face of each steel drive shoulder would be hard-faced with tungsten carbide as well as the outer face of each steel female half-coupling in the region below the flexible steel fingers.

Having described examples of employing the present invention, I claim:

1. A quickly-coupled and quickly-uncoupled threadless non-rotating steel coupling system having a central passage therethrough comprising:

a steel male half-coupling that contains around its circumference a first set of a plurality of circular saw-toothed ridges and grooves which become progressively smaller in the direction of the distal end of the steel male half-coupling, one side of the groove being at right angles to the longitudinal axis of the coupling and the other side of the groove sloping radially outwardly away from said distal end, a steel female half-coupling that is partially divided longitudinally into a plurality of flexible steel fingers and contains a second set of saw-toothed ridges and grooves that match said first set and mate there with and which become progressively smaller toward the proximal end of the steel female half-coupling, said female half-coupling having slots therein which extend longitudinally from the open end thereof toward said proximal end; drive shoulders means fixed to the male half-coupling rearwardly of said first set of saw tooth ridges and grooves for engagement by tool means to force the rigid steel male half-coupling into said steel female half-coupling spreading said flexible steel fingers as said saw-toothed ridges ratchet past each other; said male half-coupling having a beveled surface spaced rearwardly of said first set of saw-toothed ridges and grooves, said female half-coupling having a beveled surface formed on the interior surface at the terminal end thereof opposite said distal end, said beveled surfaces intersecting when the two half-couplings are completely joined together defining a V-shaped annular groove therebetween opening toward said drive shoulder means so that a tool may be inserted thereinto to simultaneously spread said fingers to allow said couplings to be separated, a compressible gasket positioned between said couplings and compressed thereby to seal the coupling system when the two half-coupling are completely joined together, which, in the uncompressed state is concave on its inner and outer side edges and convex on its top and bottom surfaces, the same gasket, which is transformed in the compressed state when both half-couplings are completely joined together, into a gasket that has straight-sided edges and straight-sided surfaces on the top and bottom of the gasket resulting in an internally-flush central passage through the coupling system.

a pair of steel pins which are permanently affixed to the distal end of the male half-coupling, and occupy said slots in the female half-coupling so as to guide and lock the two half-couplings together in such a manner that rotation of one with respect to the other cannot occur.

* * * * *